US005578158A

United States Patent [19]
Gutowski et al.

[11] Patent Number: 5,578,158
[45] Date of Patent: Nov. 26, 1996

[54] METHOD AND SYSTEM FOR FORMING A COMPOSITE PRODUCT FROM A THERMOFORMABLE MATERIAL

[75] Inventors: Timothy G. Gutowski, Newton; Gregory P. Dillon, Somerville; Haorong Li; Sukyoung Chey, both of Cambridge, all of Mass.

[73] Assignee: Massachusetts Institute of Technology, Cambridge, Mass.

[21] Appl. No.: 203,797

[22] Filed: Mar. 1, 1994

[51] Int. Cl.$^6$ ............................. B32B 31/04; B32B 31/20
[52] U.S. Cl. .................... 156/285; 156/222; 156/286; 156/382; 156/583.3; 264/510; 264/511; 264/258; 425/388; 425/389
[58] Field of Search ........................... 156/285, 286, 156/382, 583.3, 222; 264/510, 511, 258, 257; 425/389, 390, 405.1

[56] References Cited

U.S. PATENT DOCUMENTS

| | | | |
|---|---|---|---|
| 3,608,055 | 9/1971 | Long | 264/316 |
| 3,614,811 | 10/1971 | Johnson | 18/19 F |
| 4,034,054 | 7/1977 | Sauer | 264/93 |
| 4,065,340 | 12/1977 | Dickerson | 156/285 |
| 4,148,597 | 4/1979 | Larsen | 425/389 |
| 4,770,838 | 9/1988 | Cattanach et al. | 264/510 |
| 4,936,939 | 6/1990 | Woolum | 156/285 |
| 4,963,215 | 10/1990 | Ayers | 156/286 |
| 5,037,599 | 8/1991 | Olson | 264/510 |
| 5,108,532 | 4/1992 | Thein et al. | 156/285 |
| 5,156,795 | 10/1992 | Harvey et al. | 264/510 |

FOREIGN PATENT DOCUMENTS

0410590A1  1/1991  European Pat. Off. .

OTHER PUBLICATIONS

"Advanced Composites: More Processing Options", Technology News—RP/Composites, *Plastics Technology*, pp. 13, 15 and 17 (Nov. 1986).

T. Gutowski et al., "Differential geometry and the forming of aligned fibre composites", *Composites Manufacturing*, 2 No. 3/4:147–152 (1991).

S. E. Stoller, "Forming Limits of Advanced Composite Materials", *MIT–Industry Composites and Polymer Processing Program*, (Submitted to the Dept. of Mechanical Engineering at Massachusetts Institute of Technology), Engineering Thesis, pp. 1–111 (Jun. 1991).

*Primary Examiner*—Michele K. Yoder
*Attorney, Agent, or Firm*—Thomas J. Engellenner; Anthony A. Laurentano; Lahive & Cockfield

[57] ABSTRACT

A system and method for reducing the occurrence of undesirable deformations (e.g., wrinkling) in a reinforced thermoformable workpiece. The reduction in undesirable deformations is achieved by increasing the buckling resistance of the workpiece by employing a supplemental reinforcing structure. The reinforcement, in combination with a pair of shaping diaphragms, increase the effective buckling resistance applied to the workpiece during the fabrication of a composite product. The method includes forming a workpiece from a plurality of layers of a thermoformable material, and applying to at least one side of the material an external reinforcing structure to form a reinforced workpiece having a top side and a bottom side. At least one of the top or bottom sides of the reinforced workpiece is placed in contact with a diaphragm, thus forming a shaping assembly. The shaping assembly is then urged into contact with a shaping surface of a work tool to form a composite product, having a shape complementary to the shape of the tool. The composite product is then removed from the tool.

37 Claims, 2 Drawing Sheets

5,578,158

METHOD AND SYSTEM FOR FORMING A COMPOSITE PRODUCT FROM A THERMOFORMABLE MATERIAL

This invention was made with government support under Grant Number DDM-9114788 awarded by the National Science Foundation. The government has certain rights in the invention.

BACKGROUND OF THE INVENTION

This invention relates generally to systems and methods of forming and shaping thermoformable material. More particularly, the invention relates to methods and systems for forming composite products from thermoformable materials.

Conventional composite parts composed of thermoformable materials, such as thermoplastic and thermoset materials, are well known and are widely used in the aerospace industry. Composites are preferred because they exhibit desirable characteristics, such as high strength and stiffness to weight ratios, corrosion resistance, and high temperature tolerance. Although highly desirable in the relatively non-cost driven military aerospace industry, composites are not widely used in other commercial industries because of the relatively high fabrication costs of composites, and the limited number of relatively non-complex shapes that are produced from known fabrication techniques.

Conventional fabrication techniques for forming composite parts include manual lay-up, matched-metal die forming, hydroforming, and diaphragm forming. The manual lay-up fabrication process requires an artisan to manually shape individual impregnated sheets or laminates (known in the industry as "prepreg sheets") to a desired form. Each successive layer is also manually shaped until a desired product having a selected number of prepreg sheets is formed.

The matched-metal die forming fabrication process employs a pair of complementary shaped and oppositely disposed metal dies that press-form a part from one or more polymeric resin impregnated sheets or laminates. Typically, the dies are machined to very tight tolerances to form a fixed mold gap, which houses the prepreg sheet during the lubrication process. The composite material is heated by the dies, or can be heated outside the die by any suitable means and then quickly transferred to the press, to form the composite product.

Similar to the matched-metal die forming technique, hydroforming also press forms a composite product from one or more prepreg sheets, but substitutes a fluid filled membrane for the top metal die. When a forming pressure is applied to the top membrane, the composite sheet and the fluid-filled membrane conform to the shape of a rigid bottom die. The prepreg is then heated to form a composite product.

Another traditional composite fabrication process is the diaphragm forming process which employs one or more diaphragms, rather than a fluid-filled membrane, to form the composite product. In this process, stacked prepreg sheets of a thermoformable material are placed between two diaphragms, typically formed of a thermoplastic material (e.g., polyimide films). The sheets are then pressure-forced against the shaping surface of a shaping tool by subjecting the prepreg sheets and the diaphragms to a differential pressure via a vacuum or other negative pressure source, thus forming the composite product. The resulting composite product can then be removed from the tool, and subsequently cured, if desired. Examples of the above techniques are described in U.S. Pat. No. 5,037,599 to Olson; U.S. Pat. No. 5,108,532 to Thein et al.; and U.S. Pat. No. 5,156,795 to Harvey et al.

A drawback of the foregoing manual lay-up technique, among others, is the relatively labor-intensive, and thus costly, manufacturing process required to form the composite product. Another drawback of conventional fabrication techniques is that they only produce composite products having relatively simple shapes, since the formation of more complex shapes is usually accompanied by an increase in the occurrence of undesirable deformations (e.g., wrinkling). The wrinkling reduces the overall strength and structural integrity of the composite part, as well as decreases the product's overall aesthetic appeal.

Hence, there still exists a need in the art for improved manufacturing techniques that can form composite parts having relatively complex shapes while reducing the occurrence of wrinkling therein. In particular, a method of forming a composite product that decreases costs associated with the fabrication of the part would represent a major improvement in the art. Additionally, a composite component that is relatively easy to manufacture and relatively free of wrinkling would also present a major improvement in the art.

SUMMARY OF THE INVENTION

The present invention provides systems and methods for reducing the occurrence of undesirable deformations (e.g., wrinkling) in a reinforced thermoformable workpiece. The reduction in undesirable deformations is achieved by increasing the buckling resistance of the workpiece by employing a supplemental reinforcing structure. The reinforcement, in combination with a pair of shaping diaphragms, increase the effective buckling resistance applied to the workpiece during the fabrication of a composite product.

The method of the present invention includes forming a workpiece from a plurality of layers of a thermoformable material, and applying to at least one side of the material an external reinforcing structure to form a reinforced workpiece having a top side and a bottom side. At least one of the top or bottom sides of the reinforced workpiece is placed in contact with a diaphragm, thus forming a shaping assembly. The shaping assembly is then urged into contact with a shaping surface of a work tool to form a composite product, having a shape complementary to the shape of the tool. To remove the composite product from the tool, the top diaphragm and then the top reinforcing structure are first removed, and then the composite product itself. The reinforcing structure is typically not integrally formed with the composite product, e.g., become part of the product, but is typically removed, if desired, prior to curing. The mechanical support provided by the diaphragms and the external reinforcing structure reduces the occurrence of wrinkles in the thermoformable workpiece during shaping thereof into a composite product.

In one embodiment, the invention provides for evacuating air from between the reinforced workpiece and the diaphragms to form a laminated shaping assembly.

To facilitate the formation of the composite product, a differential pressure created between opposite sides of the shaping assembly urges the assembly into contact with the tool shaping surface. The workpiece is then removed from the tool and cured, with or without the reinforcing structure, by subjecting the shaped workpiece to a selected temperature and a selected pressure for a predetermined amount of time.

The present invention further encompasses a system for suppressing undesirable deformations in a thermoformable workpiece during the shaping of the workpiece into a composite product. The system includes a housing having a top portion and a bottom portion, first and second diaphragms supported in the housing, and an external reinforcing element in contact with either side of the thermoformable workpiece. The workpiece and the reinforcing element are preferably disposed between the first and second diaphragms. A work tool having a selected shaping surface mounts in the bottom portion of the housing. A differential pressure mechanism, which is in pressure communication with the housing, creates a differential pressure between the housing top and bottom portions, such that the established differential pressure urges the reinforced thermoformable workpiece into mating contact with the tool outer surface. The work tool imparts a selected shape to the workpiece. The shaped workpiece is then removed from the tool and cured to form a finished composite product having substantially reduced structural deformations.

The invention will next be described in connection with certain preferred embodiments. However, it should be clear that various changes and modifications can be made by those skilled in the art without departing from the spirit and scope of the invention. For example, various systems employing various system structural components that utilize the preferred practice of the invention can be employed to from the composite product.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DETAILED DESCRIPTION

Figure 1:
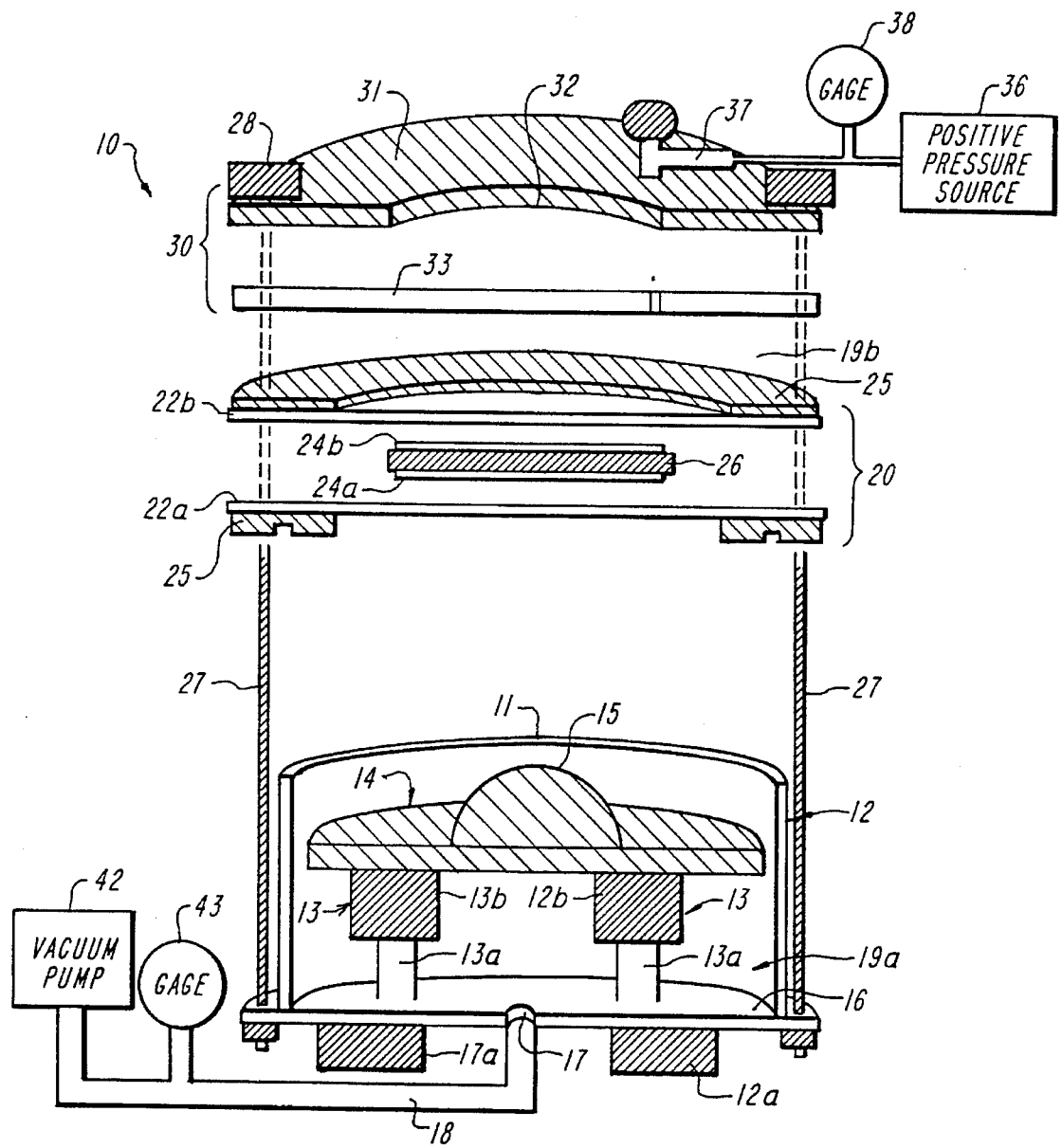
FIG. 1 depicts a cross-sectional view of a system for forming a composite product according to a preferred embodiment of the invention.

FIG. 1 depicts a system 10 for forming a composite product from a thermoformable material. The system 10 includes a housing 12, a shaping assembly 20, a housing cover assembly 30, a positive pressure source 36 in pressure communication with the housing 12 top portion, and a vacuum pump 42 in pressure communication with the housing 12 bottom portion.

The illustrated housing 12 includes a wall portion 11, preferably cylindrically shaped, and a floor portion 16. The housing floor 16 and the housing wall 11 are secured together to form a pressure-tight seal. The housing 12 is supported by a set of legs 12a. A pair of tool support stanchions 13 mounted on the floor 16 extend upwardly therefrom. The stanchions 13 include a leg portion 13a and an upper support portion 13b having a generally rectangular shape. The stanchion upper portion 13b supports a working tool 14 having an outer shaping surface 15. The working tool imparts a selected shape to a thermoformable workpiece placed in forcible contact therewith. Those of ordinary skill will recognize that the shaping surface of the working tool can have any desired shape. For example, if it is desired to form a rectangular composite product, the working tool shaping surface preferably resembles a negative of this desired shape. Referring to FIG. 1, the illustrated tool shaping surface 15 shapes and forms a semi-hemispherically shaped composite product; as explained further below. As used herein, the term "forming" is intended to mean the shaping, forming, consolidating, or co-consolidating of a workpiece composed of one or more layers of a thermoformable material into a final composite product. The final composite product can be either cured or uncured.

The housing floor 16 preferably has a center aperture 17 that communicates with a vacuum conduit 18. The conduit 18 is in pressure communication with a vacuum pump 42 and a pressure gauge 43. The vacuum pump 42 evacuates or removes air from a lower portion 19a of the housing 12, characterized as that internal portion of the housing located beneath the shaping assembly 20. The pressure gauge 43 monitors the pressure in the pressure conduit 18. The vacuum pump 42 can comprise any negative pressure pump or reversible pump capable of removing air from the housing lower portion 19a.

Figure 2:
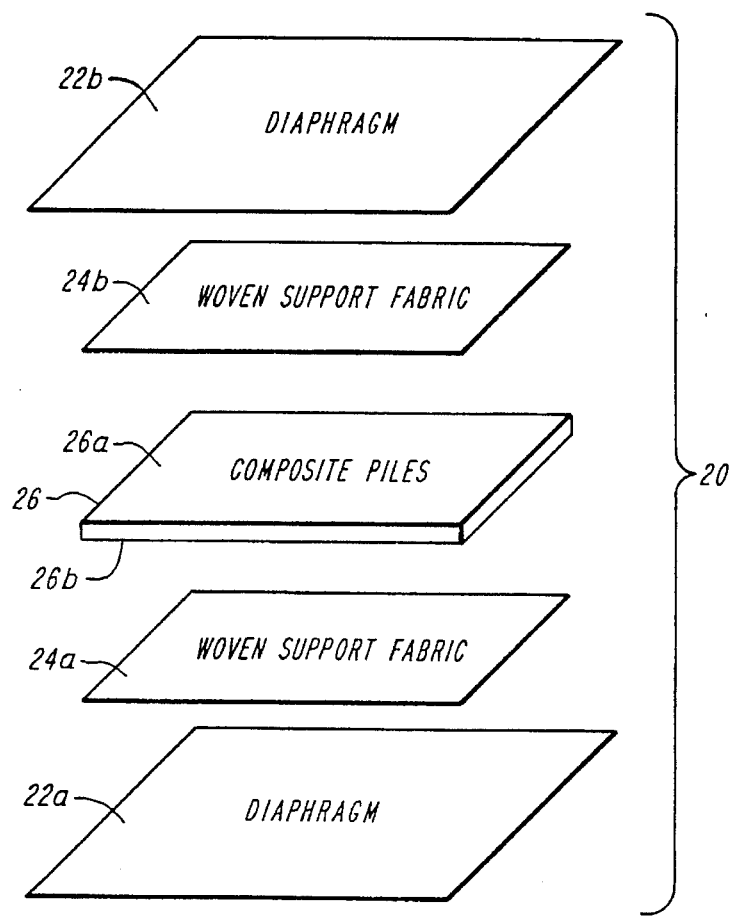
FIG. 2 is a perspective view of the shaping assembly of FIG. 1.

As shown in more detail in FIG. 2, the shaping assembly 20 includes a thermoformable workpiece 26 that is composed of a plurality of plies or prepregs of a thermoformable material. The prepregs are known in the art and are readily available in sheets. A preferred prepreg sheet has a thermoset resin that is impregnated with reinforcing fibers. The individual plies are typically stacked together, or laid-up, by hand. The term "thermoformable material" is intended to include thermoplastic and thermoset materials, or other suitable heat formable materials having high strength to stiffness ratios that are sufficiently deformable so that the materials can be shaped into a variety of selected shapes. The thermoformable material is preferably composed of a matrix of polymeric resin and reinforcing fibers. The fibers can be composed of any number of various materials, including glass, carbon, boron, boron nitride, and silicon carbide. Preferred thermoset materials include epoxy, rubber strengthened epoxy and matrix materials. The thermoplastic material can be composed of polyarylene sulfide, polyamide, polyimide, polyetherimide, polyesterimide, polyarylene polymer wherein aryl groups are separated by sulfide, sulfone, ether, ketone, and $C_1$–$C_{10}$ lower alkyl groups, polysulfone, polyethersulfone, polyphenylene sulfide, polyetherimide, polypropylene, polybenzimidazole, polyolefin, polyketone, polyetherketone, polyetherketoneketone (PEKK), polyetheretherketone (PEEK), polyester, polyamide, amorphous polymer, suitable analogs and mixtures thereof.

An external reinforcing material 24 is preferably mounted on the top 26a of the thermoformable workpiece 26, and more preferably on both sides of the workpiece 26. As shown in FIG. 2, the reinforcing material 24b contacts the thermoformable workpiece top 26a, and the reinforcing material 24a contacts the workpiece bottom 26b. The reinforcing material reduces the occurrence of undesirable deformations, e.g., wrinkling, in the thermoformable workpiece during the shaping and forming process. Undesirable deformations normally occur when high compressive stresses in the workpiece, generated during the forming process, cause a violation in the uniform fiber spacing in the thermoformable material, e.g., wrinkling. This violation causes the fibers to buckle out of plane, which compromises the structural integrity of the final product. The term "external reinforcing material" is intended to include any material that concomitantly offers mechanical support to the thermoformable material while being sufficiently deformable to allow the constituents of the shaping assembly to conform to the shape of the working tool 14. The reinforcing material preferably prevents, reduces, or suppresses the occurrence of wrinkling in the thermoformable material during the shaping process. Examples of the types of external reinforcing material that can be used include metals (e.g., stainless steel, and lanced and stretched steel), and high strength, heat resistant and chemically inert polymeric materials, as well as textiles and composites.

According to one preferred embodiment, the external reinforcement comprises thin elongate strips of stainless steel. The strips can have any desired size, shape, orientation, or spacing, but preferably comprise equally spaced apart sixteenth of an inch wire strips. Alternatively, the reinforcing material can be a wire mesh or screen. The wire mesh or screen can be formed by interleaving parallel wire strips with textile cross-fibers by any suitable mechanical means, such as by a loom. Decreasing the distance between adjacent strips increases the overall mechanical support applied to the thermoformable workpiece. As stated above, an increase in the buckling resistance reduces the occurrence of undesirable deformations in the workpiece, and increases the number of potential contours of the final composite product. The reinforcing material can be coated with a suitable non-stick or releasing coating, such as silicone or TEFLON™, to facilitate easy separation from the diaphragms and thermoformable material following forming. Alternatively, the thermoformable can be coated with a suitable releasing coating to facilitate easy separation.

The reinforced workpiece is preferably disposed between a bottom diaphragm 22a and a top diaphragm 22b. The diaphragms 22a and 22b provide additional mechanical support to the reinforced workpiece, thus further decreasing the occurrence of undesirable deformations during the formation process. The diaphragms can be composed of any high strength, elastic material such as rubber, silicone rubber, and even ductile metals. The diaphragm forming process is the preferred fabrication technique since the process helps maintain biaxial tension on the thermoformable workpiece, as well as a compressive normal force on the workpiece surfaces, throughout the forming process.

According to a preferred practice of the invention, the diaphragms can also be coated with a suitable non-stick or releasing coating, such as silicone or TEFLON™, which facilitates relatively easy separation of the diaphragms from the reinforced workpiece. Easy separation between the shaping assembly components helps prevent the bonding of the reinforced workpiece to the diaphragm during the formation process.

Referring again to FIG. 1, a pair of support rings 25 can be used to secure together the individual components, e.g., the diaphragms 22a, 22b, external reinforcing members 24a, 24b, and the thermoformable workpiece 26, of the shaping assembly 20.

The cover assembly 30 includes a cover plate 31 having a central viewing hole 32 formed therein, and a secondary cover support structure 33, preferably formed from a sheet of transparent polycarbonate material. The assembly 30, when secured to the housing 12, forms a substantially pressure-tight seal. The viewing hole 32 allows a system operator to view and monitor the shaping process.

A pressure conduit 37 connects a positive pressure source 36 to the housing 12. Preferably, the cover plate 31 has formed thereon an aperture that connects the conduit 37 with a top portion 19b of the housing 12, which is characterized as that portion of the housing disposed above the shaping assembly 20. The positive pressure source 36 applies a positive pressure to the top of the shaping assembly 20. A pressure gauge 38 allows the system operator to monitor the applied pressure. A series of vertical fixation rods 27 and bolts 28 secure the cover assembly 30 to the housing 12.

According to a preferred practice of the invention, a composite product can be fabricated by initially forming a thermoformable workpiece from a plurality of individual plies of a thermoformable material. The thermoformable workpiece then has applied thereto, on both sides, an external reinforcing material. The reinforcing material can be applied manually or by any suitable mechanical means. This reinforced workpiece is then placed between two diaphragms to form a shaping assembly 20. In one preferred embodiment, air located between the assembly constituents is evacuated via a vacuum pump, negative pressure source or other suitable means. For example, a separate conduit in pressure communication with the vacuum pump 42 and the shaping assembly 22 can remove the air. The vacuum environment created by the evacuated-air compresses the assembly constituents together to prevent movement of the parts relative to each other during the forming process.

Figure 3:
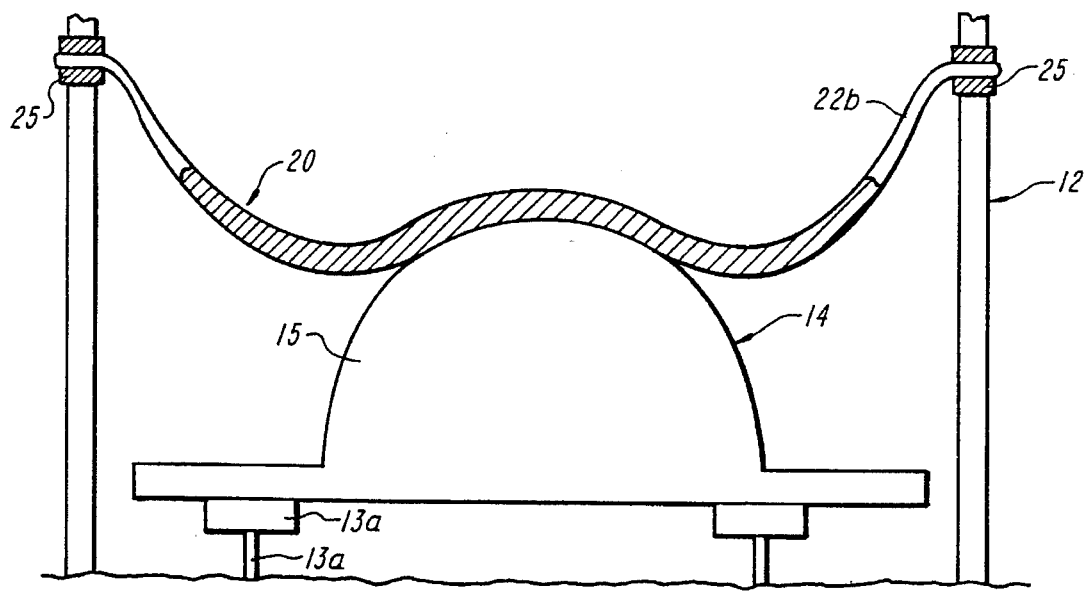
FIG. 3 is a cross-sectional view similar to that of FIG. 1 showing the thermoformable workpiece in forcible, shaping contact with a working tool.

The vacuum pump 42 and/or the positive pressure source 36 creates a negative differential pressure between the housing top and bottom portions 19a and 19b, respectively. As used herein, the term "negative differential pressure" is intended to include any pressure situation in which the shaping assembly 20 is deformed by a pressure difference between its upper and lower surfaces. This negative differential pressure urges the shaping assembly 20 into contact with the shaping surface 15 of the shaping tool 14 to form the composite part (see FIG. 3). This differential pressure also forces the reinforcing material to bend or conform to the shape of the tool outer surface. The external reinforcing structure essentially increases or supplements the effective stiffness and therefore the buckling resistance of the shaping assembly when the mechanical support (e.g., elastic stiffness) provided by the diaphragms is insufficient to suppress wrinkling.

After the composite product is formed, the composite product is removed from the tool by any suitable means. The composite product can then be cured by subjecting the product to an elevated temperature and pressure for a selected time. In a preferred embodiment, the product is heated for 2 hours at 375° F. while the pressure is maintained at about 100 psi. Those of ordinary skill will readily recognize that the curing step is material specific, and that the corresponding time, temperature and pressure levels necessary to cure the part will vary depending upon the material used.

Typically, prior to the curing step, the diaphragms and reinforcing material are removed from the product, however, those of ordinary skill will recognize that the reinforcing material can remain attached to the workpiece if it is desirable to cure simultaneously the workpiece and the reinforcement into a single finished product.

A significant advantage of the present invention, which employs a reinforcing material to increase the buckling resistance and effective stiffness of the shaping assembly, is that the finished composite product contains substantially fewer undesirable deformations which manifest themselves as wrinkles formed at the bends or contours of the composite product. Additionally, since the reinforcement suppresses wrinkling, composite parts having relatively more complex shapes can be formed by the composite forming process of the present invention.

Having described the invention, what is claimed as new and desired to be secured by Letters Patent is:

1. A method of reducing the occurrence of undesirable deformations in a reinforced thermoformable workpiece formed during shaping of said workpiece into a composite product, comprising forming said thermoformable workpiece from a plurality of layers of a thermoformable material;

applying an external reinforcing material for increasing the buckling resistance of said workpiece by adding additional mechanical support to at least one side of said thermoformable material workpiece to form a reinforced workpiece having a top side and a bottom side;

placing at least one of the top and bottom sides of said reinforced workpiece in contact with a diaphragm to form a shaping assembly;

urging said shaping assembly into contact with a shaping surface of a shaping tool to form a composite product, said product being complementary in shape to said shaping tool;

separating said external reinforcing material and said diaphragm from said composite product; and removing said composite product from said shaping tool, wherein said reinforcing material increases the buckling resistance of said workpiece, thereby reducing the occurrence of undesirable deformations in said thermoformable material during shaping thereof into a composite product.

2. The method of claim 1 further comprising, after the step of placing the reinforced workpiece in contact with a diaphragm, evacuating said air from between said reinforced workpiece and said diaphragm to form a laminated shaping assembly.

3. The method of claim 2 further comprising, during the step of urging said shaping assembly into contact with said shaping tool, creating a differential pressure between opposite sides of said shaping assembly.

4. The method of claim 1 further comprising, after the step of urging said shaping assembly into contact with said shaping tool, curing said thermoformable material by subjecting said material to a selected temperature and a selected pressure for a predetermined amount of time.

5. The method of claim 1 wherein said thermoformable material is selected from the group consisting of thermoset and thermoplastic materials.

6. The method of claim 1 wherein said thermoformable material is a thermoset material.

7. The method of claim 6 wherein said thermoset comprises a matrix of polymeric resin and reinforcing fibers.

8. The method of claim 7 wherein said reinforcing fibers are selected from the group consisting of glass, carbon, boron, boron nitride, and silicon carbide.

9. The method of claim 1 wherein said thermoformable material is a thermoplastic material.

10. The method of claim 9 wherein said thermoplastic material is selected from the group consisting of polyarylene sulfide, polyimide, polyetherimide, polyesterimide, polyarylene polymer wherein aryl groups are separated by sulfide, sulfone, ether, ketone, carbonate, and $C_1$–$C_{10}$ lower alkyl groups, polysulfone, polyethersulfone, polyphenylene sulfide, polyetherimide, polypropylene, polybenzimidazole, polyolefin, polyketone, polyetherketone, polyetherketoneketone, polyetheretherketone, polyester, polyamide, amorphous polymer, and mixtures thereof.

11. The method of claim 1 wherein said external reinforcing material is selected from the group consisting of nylon, thermoset material, thermoplastic material, metal, textiles, composites, kevlar, and glass fibers.

12. The method of claim 1 wherein said external reinforcing material is metal.

13. The method of claim 12 wherein said diaphragm is selected from the group consisting of thermoplastic material, thermoset material, ductile metal, nylon aluminum, and rubber.

14. The method of claim 1 wherein said undesirable deformations comprise wrinkling in said composite product.

15. A method of reducing the occurrence of undesirable deformations in a reinforced thermoformable workpiece formed during shaping of said workpiece into a composite product, comprising forming said workpiece from a plurality of layers of a thermoformable material;

applying as external reinforcing material for increasing the buckling resistance of said material by adding mechanical support to at least said top of said thermoformable workpiece to form a reinforced workpiece having a top side and a bottom side;

placing said reinforced workpiece between a first diaphragm and a second diaphragm, such that said first diaphragm contacts said top side of said workpiece and said second diaphragm contacts said bottom side of said workpiece;

urging said second diaphragm into contact with a shaping surface of a shaping tool to form a composite product, said product being complementary in shape to said shaping tool;

separating said external reinforcing material and said first and second diaphragms from said composite product; and removing said composite product from said shaping tool, wherein said reinforcing material increases the buckling resistance of said material, thereby reducing the occurrence of undesirable deformations in said thermoformable material during shaping thereof into a composite product.

16. The method of claim 15 further comprising, after the step of placing said reinforced workpiece in contact with a diaphragm, evacuating said air from between said intermediate assembly and said first and second diaphragms to form a laminated shaping assembly.

17. The method of claim 16 further comprising, during the step of urging said shaping assembly into contact with said shaping tool, creating a differential pressure between opposite sides of said shaping assembly.

18. The method of claim 17 wherein said differential pressure is a negative differential pressure.

19. The method of claim 15 further comprising, after the step of urging said shaping assembly into contact with said shaping tool, curing said thermoformable material by subjecting said material to a selected temperature and a selected pressure for a predetermined amount of time.

20. The method of claim 15 wherein said thermoformable material is selected from the group consisting of thermoset and thermoplastic materials.

21. The method of claim 15 wherein said thermoformable material is a thermoset material.

22. The method of claim 21 wherein said thermoset comprises a matrix of polymeric resin and reinforcing fibers.

23. The method of claim 22 wherein said reinforcing fibers are selected from the group consisting of glass, carbon, boron, boron nitride, and silicon carbide.

24. The method of claim 15 wherein said thermoformable material is a thermoplastic material.

25. The method of claim 24 wherein said thermoplastic material is selected from the group consisting of polyarylene sulfide, polyimide, polyetherimide, polyesterimide, polyarylene polymer wherein aryl groups are separated by sulfide, sulfone, ether, ketone, carbonate, and $C_1$–$C_{10}$ lower alkyl groups, polysulfone, polyethersulfone, polyphenylene sulfide, polyetherimide, polypropylene, polybenzimidazole, polyolefin, polyketone, polyetherketone, polyetherketoneketone, polyetheretherketone, polyester, polyamide, amorphous polymer, and mixtures thereof.

26. The method of claim 15 wherein said external reinforcing material is selected from the group consisting of nylon, polyimide film, thermoset material, thermoplastic material, metal, kevlar, and glass fibers.

27. The method of claim 15 wherein said external reinforcing material is metal.

28. The method of claim 15 wherein said diaphragm is selected from the group consisting of polyimide film, thermoplastic material, thermoset material, ductile metal, nylon and aluminum.

29. The method of claim 15 wherein said undesirable deformations comprise wrinkling in said composite product.

30. A system for suppressing wrinkling in a reinforced thermoformable workpiece formed during shaping of said workpiece into a composite product, said system comprising housing means forming a housing having a bottom portion and a top portion;

diaphragm means, disposed within said housing and supported therein, forming a first diaphragm and a second diaphragm;

external reinforcing means, placed in contact with at least a top face of a thermoformable workpiece having a top Face and a bottom face, for providing additional mechanical support thereto to increase the buckling resistance of the workpiece;

said thermoformable workpiece and said reinforcing means being arranged between said first and second diaphragms, thereby forming a shaping assembly;

a work tool disposed on said housing bottom and having an outer surface with a selected shape;

differential pressure means, in pressure communication with said housing means, for creating a differential pressure between said housing top portion and said housing bottom portion, wherein said differential pressure established by said differential pressure means urges said shaping assembly against said tool outer surface, said shaping assembly being formed into a shape complementary to said shape of said work tool; and means for curing said shaping assembly into a composite product;

wherein said external reinforcing means suppresses wrinkling of the shaping assembly during the formation process and is capable of being removed from the composite product after said formation process, and is capable of being removed from the composite product after said formation process.

31. The system of claim 30 further comprising vacuum means, in pressure communication with said housing means, said reinforcing means, said diaphragm means, and said thermoformable workpiece, for compressing said diaphragms, said reinforcing means, and said thermoformable structure into a laminated shaping assembly.

32. The system of claim 31 wherein said means for curing includes temperature means for exposing said shaping assembly to a selected temperature for a predetermined amount of time; and pressure means for exposing said shaping assembly to a selected pressure for a predetermined amount of time.

33. The system of claim 30 wherein said differential pressure means is a negative differential pressure means.

34. The system of claim 30 wherein said external reinforcing means is a material which is selected from the group consisting of nylon, polyimide film, thermoset material, thermoplastic material, metal, kevlar, and glass fibers.

35. The system of claim 30 wherein said external reinforcing means is a metal layer.

36. The system of claim 30 wherein said diaphragm is selected from the group consisting of polyimide film, thermoplastic material, thermoset material, ductile metals, nylon and aluminum.

37. The system of claim 30 wherein said reinforcing material is capable of preventing wrinkling in said composite product.

* * * * *

UNITED STATES PATENT AND TRADEMARK OFFICE
CERTIFICATE OF CORRECTION

PATENT NO. : 5,578,158
DATED : November 26, 1996
INVENTOR(S) : Timothy G. Gutowski et al.

It is certified that error appears in the above-identified patent and that said Letters Patent is hereby corrected as shown below:

At column 1, lines 43-44, please replace "lubrication" with --fabrication--.

Signed and Sealed this

Fourteenth Day of October, 1997

*Attest:*

BRUCE LEHMAN

*Attesting Officer*     *Commissioner of Patents and Trademarks*